(12) United States Patent
Grenga et al.

(10) Patent No.: US 6,421,888 B1
(45) Date of Patent: Jul. 23, 2002

(54) STATIC LINE SNAP

(75) Inventors: Todd M. Grenga, Enfield; John R. Schumann, South Windsor; Mark N. Heflin, Manchester, all of CT (US)

(73) Assignee: Capewell Components Company Limited Partnership, South Windsor, CT (US)

( * ) Notice: Subject to any disclaimer, the term of this patent is extended or adjusted under 35 U.S.C. 154(b) by 7 days.

(21) Appl. No.: 09/705,573

(22) Filed: Nov. 3, 2000

Related U.S. Application Data (63) Continuation-in-part of application No. 09/343,141, filed on Jun. 29, 1999, now abandoned.

(51) Int. Cl.[7] .......................... A44B 13/00; B63B 21/04
(52) U.S. Cl. .................... 24/601.5; 24/598.9; 24/599.5; 24/599.6; 24/600.1
(58) Field of Search .............................. 24/601.5, 600.1, 24/599.6, 599.5, 598.9, 598.5; 294/82.33

(56) References Cited

U.S. PATENT DOCUMENTS

| | | | | |
|---|---|---|---|---|
| 302,028 A | * | 7/1884 | Raymond | 24/599.6 |
| 594,335 A | * | 11/1897 | Donaldson | 24/599.6 |
| 612,194 A | * | 10/1898 | Clough | 24/599.6 |
| 947,764 A | * | 1/1910 | Schartow | 24/600.1 |
| 1,618,321 A | * | 2/1927 | Woods | 24/598.9 |
| 3,292,226 A | * | 12/1966 | Foster | 24/601.5 |
| 4,249,765 A | * | 2/1981 | Janssen | 294/82.33 |
| 4,279,062 A | * | 7/1981 | Boissonnet | 24/601.5 |
| 5,832,571 A | * | 11/1998 | Kanamori | 24/599.5 |

FOREIGN PATENT DOCUMENTS

GB 1047076 * 11/1966 ................ 24/599.6

* cited by examiner

Primary Examiner—Victor Sakran
(74) Attorney, Agent, or Firm—Alix, Yale & Ristas, LLP (57) ABSTRACT

A static line snap comprising an elongated body including a handle portion and an opposing C shaped portion for attachment to an anchor. The attachment portion includes a cavity with a load end and a lock end, and opposing arms defining a slot. A keeper with two gates is movably mounted adjacent the slot. The keeper has a lock position and a load position, with a first gate partitioning the load end from the lock end in the keeper load position and a second gate partitioning the load end from the lock end in the keeper lock position.

20 Claims, 6 Drawing Sheets

STATIC LINE SNAP

CROSS REFERENCE TO RELATED APPLICATIONS

The present application is a continuation-in-part application of U.S. patent application No. 09/343,141 filed Jun. 29, 1999 now abandoned.

BACKGROUND OF THE INVENTION

The present invention relates generally to a connector or fastener for coupling a first line or webbing to an anchoring point. More particularly, the invention relates to a snap assembly for coupling a parachute static line to an anchor cable.

Existing static line snap assemblies are comprised of three major components. The first component comprises an elongated body that includes a hook with an opening. The hook and most of the body fit within a guard for slidable movement between an open position and a closed position. In the open position, the hook opening is exposed while in the closed position, the hook opening is covered by the guard. A push button type latch prevents free movement of the body away from the closed position. The configuration and interaction of the existing snap assembly parts make use of this existing snap awkward. In order to open the snap, one must use both hands. The first hand grips the body and depresses the button latch. The second hand is required to pull the guard back, exposing the hook opening so that the snap assembly can be placed over an anchor line. This process is made even more difficult by the small size of the snap assembly and short length of the body projecting from the guard, both of which are difficult to grasp and actuate with a parachutist's gloved hands. In addition, a safety pin has to be installed in the existing static line snap to prevent accidental release from the anchor cable as a series of parachutists exit the aircraft.

SUMMARY OF THE INVENTION

It is an object of the present invention to provide a static line snap assembly which may be used with one hand.

It is another object of the present invention to provide a static line snap assembly which is more ergonomically designed than prior static line snap assemblies and does not require a safety pin.

It is a further object of the present invention to provide a new and improved static line snap assembly which can be readily attached or released from a fixed anchor line using a single gloved hand and which provides a dual level of anchor line retention.

The objects of the invention are achieved by the use of a static line snap comprising an elongated body, including a handle portion and an opposing attachment portion. The attachment portion is preferably C-shaped with facing or opposing arms defining an entry slot into an elongated attachment cavity. The attachment cavity includes a load end and an opposing lock end. Preferably, the entry slot is offset from the load and lock ends. A dual-gated keeper is movably mounted to the attachment portion adjacent the slot. In one embodiment the keeper comprises independently mounted and biased first and second latch pieces. The keeper preferably is biased toward a lock position and away from a load position and limited to pivotal movement between these positions. In the lock position, the keeper first gate blocks the attachment portion entry slot and the second gate partitions the attachment cavity between the load and lock ends. When the keeper is moved to the load position, the second gate is moved adjacent to an attachment portion arm and the first gate is within attachment cavity; partitioning the cavity between the load and lock ends and allowing access through the attachment portion entry slot into the load end. One arm may have a beveled end to help guide the anchor cable into the entry slot. Thus, an anchor line must pass by both gates to be positioned within the lock end of the attachment cavity, and likewise, must pass by both gates to be withdrawn from the lock end of the attachment cavity. The internal surfaces of the cavity may be rounded to lessen chafing and ease retraction of the snap from an attached anchor line.

The handle portion is preferably ergonomically designed, with multiple, spaced finger grooves along one edge for the user's fingers and an opposing edge contour for the user's palm. Further, the finger grooves and palm contour are preferably sized to accommodate a user's hand when gloved. The handle portion may include an enlarged connection point for a line and indents on the edges. The internal edges of the connection point may be rounded to lessen chafing.

In use, a parachutist grasps the handle portion of the static line snap in a single hand, typically with the contour in the palm of the hand and fingers wrapping around the finger grooves, and pushes the first gate against the anchor cable. Continued movement in this direction causes the anchor cable to push the keeper to the load position while at the same time moving the anchor cable through the entry slot into the attachment cavity. Subsequent movement of the attachment cavity load end toward the anchor cable, moves the anchor cable away from the first gate. This allows the gate to return to the lock position, thereby trapping the anchor cable between the second gate and the attachment cavity load end. Movement of the attachment cavity lock end toward the anchor cable forces the anchor cable against the second gate, pushing that gate into the load position. This allows the anchor cable to move past the second gate to a position adjacent the attachment cavity lock end. Once the anchor cable is free of the second gate, it pivots back to the lock position. The anchor cable is now trapped between the second gate and the attachment cavity lock end. Since keeper rotation is limited, movement of the cable, trapped in the cavity lock end, against the second gate cannot act to pivot the keeper away from the lock position. It should be appreciated that this sequence of operations requires only minor rapid movement of the static line snap with a single hand of the user, the pivoting of the keeper being automatic in response to the movement of the handle portion in relation to the anchor cable.

To release the anchor line from the static line snap, the sequence of operations is reversed, with the keeper requiring manual actuation between the load and lock positions. To make actuation of the keeper easier, the keeper includes an actuating surface that is preferably sized to be easily used with gloved hands and may be knurled or serrated. It should again be appreciated that release of the anchor cable from the snap can be performed with a single hand. Thus, the dual gated keeper raises two barriers to the removal of a captured anchor cable, providing a dual level of anchor line retention while at the same time allowing convenient use with only a user's single hand. Preferably the snap requires minimal force to attach and remove an anchor line while having a working load over 2,000 pounds.

BRIEF DESCRIPTION OF THE DRAWINGS

Other objects and advantages of the invention will be evident to one of ordinary skill in the art from the following detailed description made with reference to the accompanying drawings, in which.

DESCRIPTION OF THE PREFERRED EMBODIMENTS

Figure 1:
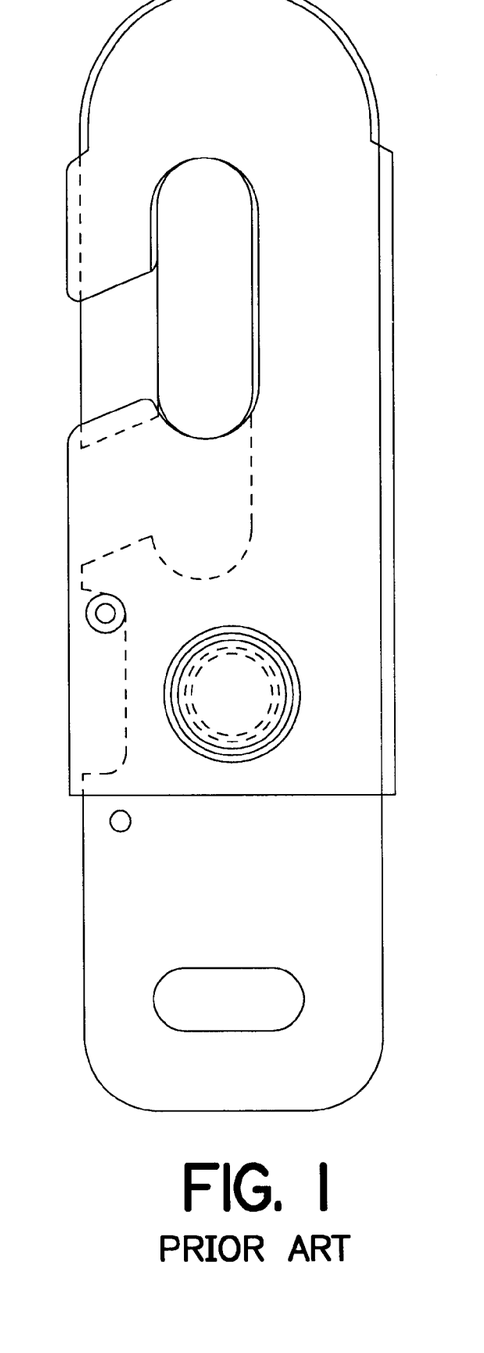
FIG. 1 is a side view, partially in phantom, of a conventional static line snap assembly.
Figure 2:
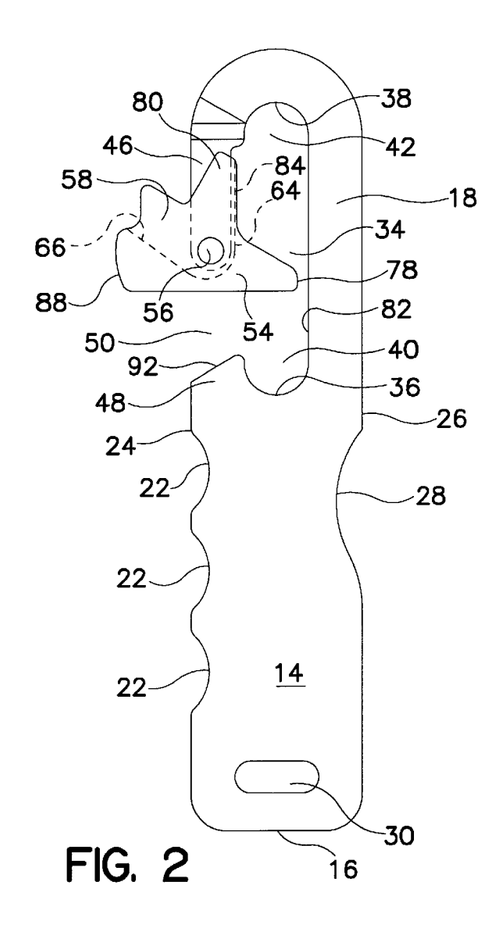
FIG. 2 is a side view, partially in phantom, of one embodiment of a static line snap in the load position.
Figure 3:
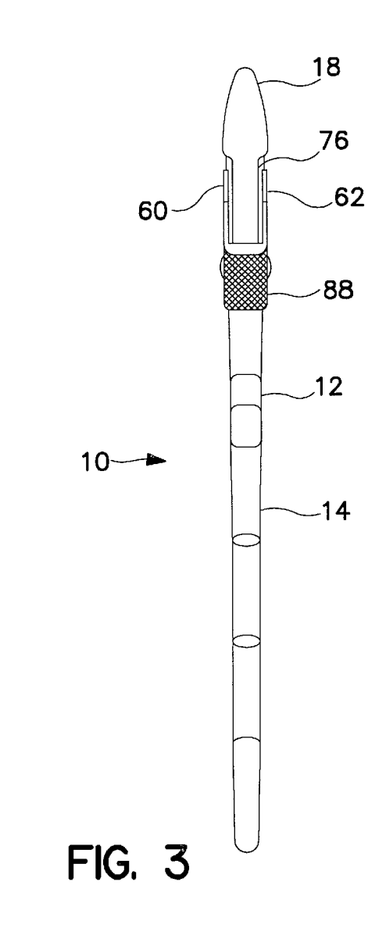
FIG. 3 is a front edge view of the static line snap of FIG. 2.

Referring now to the drawings, wherein like reference numerals indicate like parts throughout the figures, an inventive static line snap, generally designated by the numeral 10, is shown as comprising an elongated unitary body 12 as best shown in FIGS. 2 and 3. The generally linear body 12 includes a handle portion 14 terminating at a free end 16 and an opposing C-shaped attachment portion 18. In a preferred version the body 12 is about eight inches long by about two inches wide by about three-eighths of an inch thick. A body with the attachment portion at an angle to the handle portion is also possible.

The handle portion 14 is sized and designed to be ergonomically grasped and held by a single gloved hand. The ergonomic design incorporates a plurality of finger grooves 22 spaced along a front edge 24 of the body between the attachment portion 18 and the handle free end 16. Opposing the front edge 24 of the body 12 is a rear edge 26 that includes an ergonomic palm contour 28. The handle may include apertures or relieved areas to reduce weight. The handle free end 16 includes a connection point 30 for a parachute static line (not shown). In one embodiment the connection point 30 is comprised of a slot elongated in the front to rear edge direction. The inside edges of the connection point may be rounded to lessen potential chafing of the attached line.

The C-shaped attachment portion 18 defines an elongated attachment cavity 34 with a load end 36 adjacent the handle portion and an opposing lock end 38. The C-shaped attachment portion 18 terminates in generally facing arms 46, 48 which define a slot 50 therebetween for entry into, and exit out of, the cavity load end 36. Preferably, the arms 46, 48 terminate so that the slot 50 is positioned between the cavity ends 36, 38 and provides an opening from the front edge 24 of the body 12 to the cavity 34. Alternatively, and not shown, the slot may provide an opening from the body rear edge 26 to the cavity 34. The inside edges of the attachment portion may be rounded to lessen chafing of the captured line and ease retraction of the snap from the line.

A gated keeper 54 is rotatably mounted to an arm 46 adjacent to the attachment portion slot 50 by a pivot pin 56. The keeper 54 could also be mounted to arm 48. In one embodiment shown in FIGS. 1–4 the keeper is unitary with an internal bifurcated section 58. The bifurcated section 58 is defined by spaced mounting wings 60, 62 (shown in FIG. 3) and walls 64, 66. The wings 60, 62 are parallel with the handle sides, and each wing includes an aperture. The arm 46 includes an aperture transverse to the edge and preferably has a relieved portion 76 that fits within the keeper bifurcated section 58. The pivot pin 56 extends through the apertures in the arm 46 and wings 60, 62 to mount the keeper for pivotal movement between a load position shown in FIG. 2 and a lock position shown in FIG. 4a. The walls 64, 66 alternately abut, or are at least adjacent to, opposing edges of arm 46 in the load and lock positions, thereby acting as rotational limits or stops for the keeper 54.

The keeper 54 preferably includes a first gate 78 and an angularly offset second gate 80. In the keeper lock position shown in FIG. 4a, the first gate 78 projects to a point adjacent arm 48 thereby blocking slot 50 and the second gate 80 projects to a point adjacent the cavity internal back wall 82, thereby partitioning the cavity load end 36 from the lock end 38. As used herein the directions clockwise and counterclockwise are made with reference to the drawings. As the keeper is moved counterclockwise to the load position shown in FIG. 4b, the second gate 80 is moved to a point adjacent to the attachment arm 46 and the first gate 78 is pivoted away from arm 48 and projects to a position adjacent the cavity internal wall 82; exposing slot 50 and partitioning the cavity load end 36 from the cavity lock end 38. The pivotal mounting of the keeper 54 to the arm 46 creates an arc through which both gates 78, 80 swing in moving from the lock position to the load position and vice versa. The length of the cavity 34; the termination position of the arms 46, 48; the positioning of the slot 50 between the cavity ends 36, 38; and the mounting location of the keeper 54 create a hollow 40, 42 at each cavity end 36, 38 respectively, which is beyond the keeper swing arc. Preferably, a spring 84, located within the bifurcated section 58, biases the keeper 54 clockwise as viewed in FIG. 2 toward the lock position. The keeper 54 includes an actuating surface 88 (FIG. 3) projecting outside the front edge of the snap 10, for manual actuation of the keeper 54 between the lock position and load position.

Figure 4A:
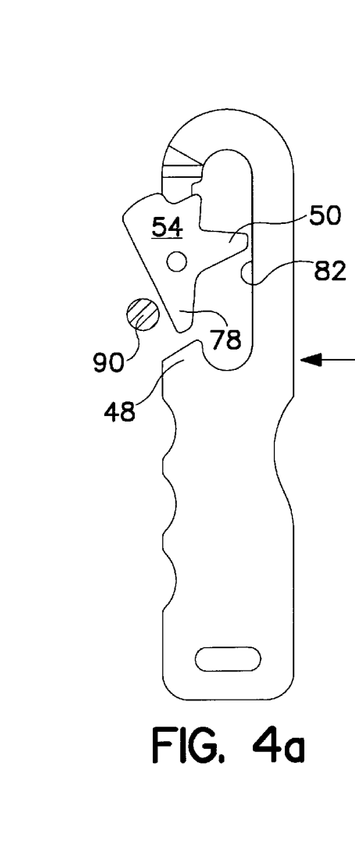
FIGS. 4a–4e are side views of the static line snap of FIG. 2 showing a cross-section of an anchor line and the sequence of operations to attach the static line snap to the anchor line.
Figure 4B:
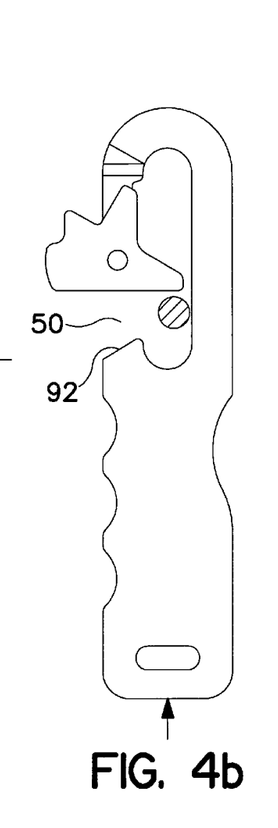
Figure 4C:
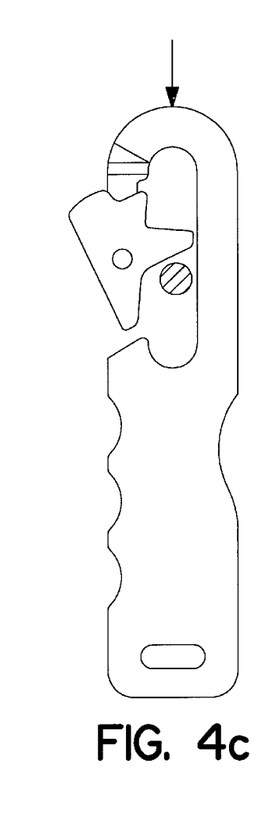
Figure 4D:
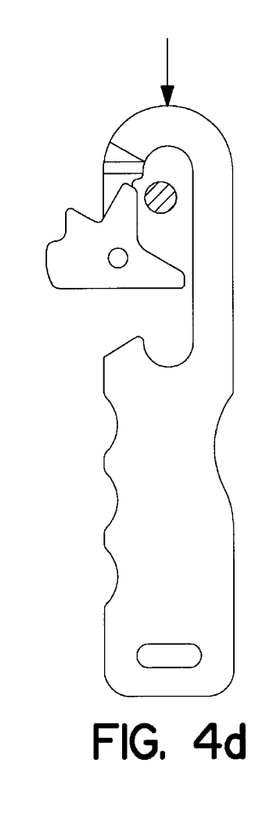
Figure 4E:
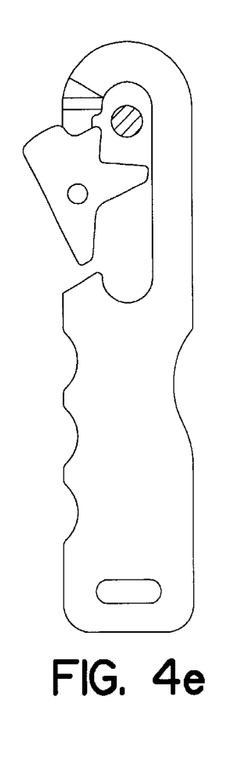

Typically, the static line snap 10 will be grasped by a user's gloved hand, with the user's fingers fitting within the finger grooves 22 and the user's palm filling the palm contour 28. As shown in FIG. 4a, the user moves the static line snap 10 toward an anchor line 90, forcing the keeper first gate 78 against the anchor cable 90. The keeper 54 is thereby pivoted counterclockwise into the load position, allowing the anchor line 90 to move through slot 50 into the attachment cavity 34 as in FIG. 4b. One arm 48 may have a beveled end 92 to aid in guiding the anchor cable 90 into and through the slot 50. Movement of the cavity load end 36 toward the anchor cable 90 places the cable 90 in the load end hollow 40. This frees the keeper 54 to pivot back to the lock position under the driving action of spring 84 and traps the anchor cable 90 between the second gate 80 and the attachment cavity load end 36, as shown in FIG. 4c. In this relationship, the keeper 54 is prevented from rotating in a clockwise direction by the wall 66 abutting the edge of arm 46 (see FIG. 2). Therefore the cable 90 cannot push past the keeper first gate 78 to exit the cavity 34. Movement of the cavity lock end 38 toward the anchor cable 90 forces the anchor cable 90 against the second gate 80, again pivoting the keeper 54 counterclockwise back to the load position as shown in FIG. 4d and allowing the anchor cable 90 to move into the cavity lock end 38. Continued movement of the attachment cavity lock end 38 toward the cable 90 places the cable 90 in the lock end hollow 42 and frees the keeper 54 to swing back to the lock position as shown in FIG. 4e, thereby trapping the anchor cable 90 between the second gate 80 and the attachment cavity lock end 38. With the anchor cable 90 thus trapped, and stop surface 66 preventing further clockwise movement of the keeper, both the second gate 80 and first gate 78 prevent the cable 90 from exiting the cavity 34 through the slot 50.

It should be appreciated that while the sequence of operations necessary to attach the static line snap 10 to an anchor cable 90 is complicated in description, in practice it can quickly and readily be accomplished by simply grasping the handle portion 14 in one hand and moving the static line snap 10 in a rapid "snap/strike/strike" motion onto the cable 90; no manual actuation of the keeper is needed. Preferably, the keeper pivots less than 90 degrees between the lock and load positions to further enhance the rapid attachment of the snap to the anchor line. Thus, the inventive, ergonomically designed static line snap is a significant improvement over prior static line snap assemblies such as those shown in FIG. 1 which require both hands to connect to an anchor line. Further, the inventive static line snap provides an additional level of anchor line retention compared to prior snap assemblies that have only a single gate. The increased level of anchor line retention allows the inventive static line snap to eliminate the previously used safety pin.

To remove the static line snap 10 from the anchor cable 90 positioned in the lock end hollow 42, the keeper 54 is manually pivoted to the load position via finger engagement with the projecting actuating surface 88. Moving the attachment cavity lock end 38 away from the cable 90 allows the cable 90 to push against the keeper first gate 78 from the position shown in FIG. 4d to that of FIG. 4c, thereby pivoting the keeper 54 back to the lock position, wherein the anchor cable 90 is trapped between the first gate 78 and the attachment cavity load end 36. The limited rotation of the keeper 54 prevents the anchor cable 90 from pushing past the first gate 78 and exiting the attachment cavity 34. Movement of the anchor cable 90 into the load end hollow 40 allows the keeper 54 to be manually pivoted again back to the load position shown in FIG. 4b, thereby allowing the anchor cable 90 to be removed through the attachment cavity slot 50. Preferably, the keeper actuating surface 88 is knurled or serrated to assist a user in actuating the keeper 54 with a gloved hand.

Figure 5:
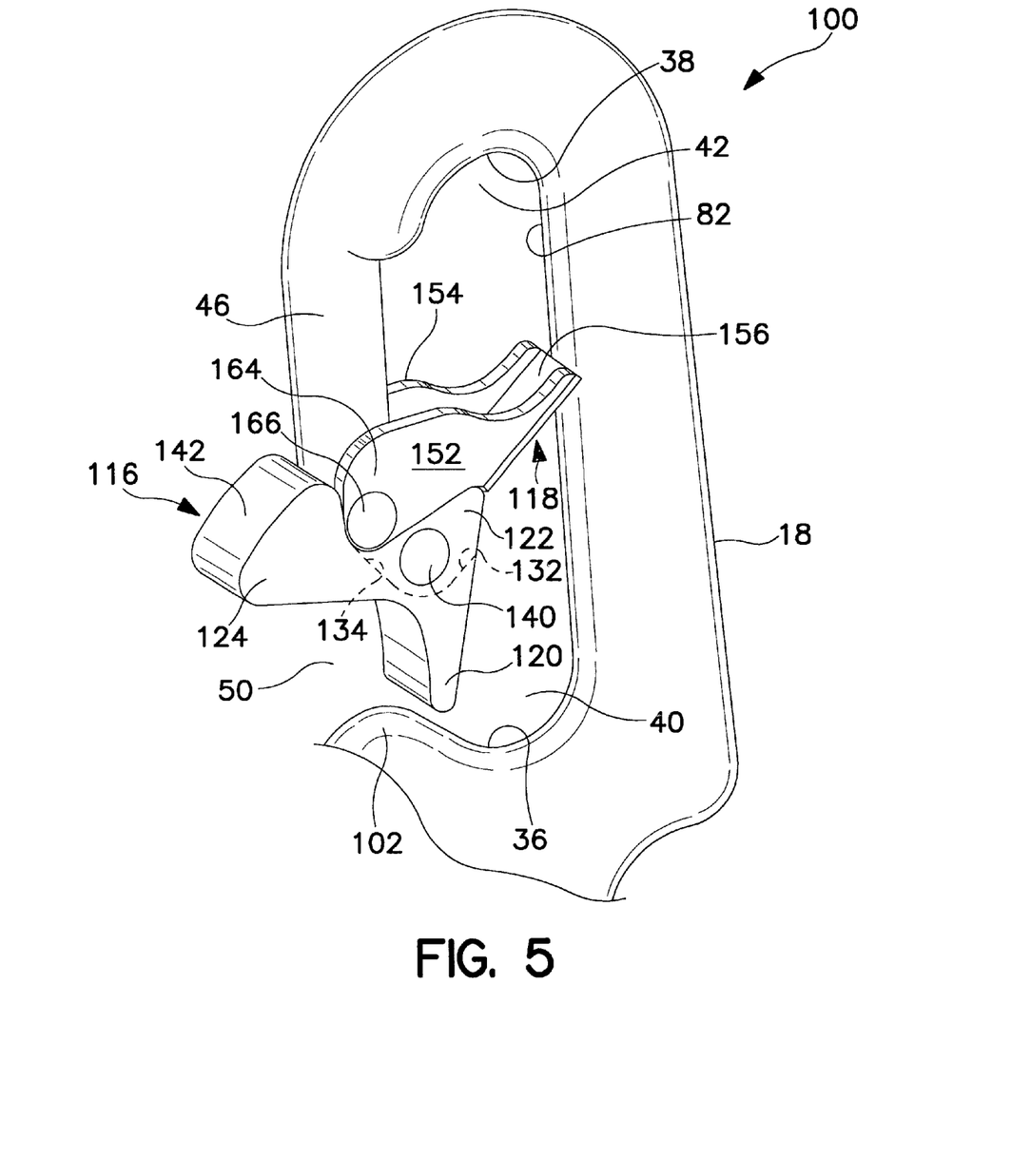
FIG. 5 is a partial, perspective view of another embodiment of an inventive static line snap.
Figure 6A:
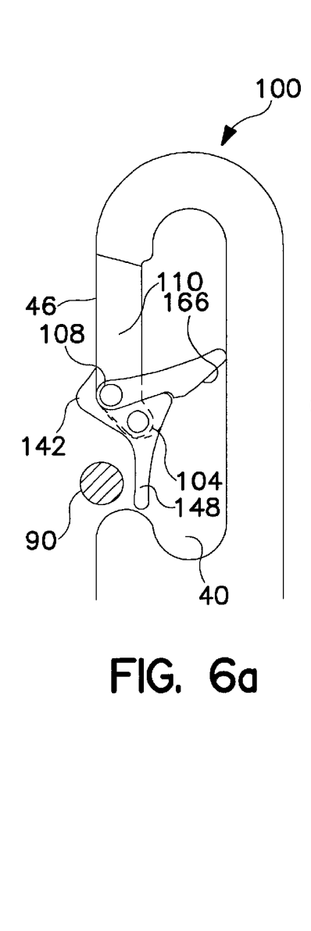
FIGS. 6a–6e are partial side views, partly in phantom, of the static line snap of FIG. 5 showing a cross-section of an anchor line and the sequence of operations to attach the static line snap to the anchor line.
Figures 6B, 6C:
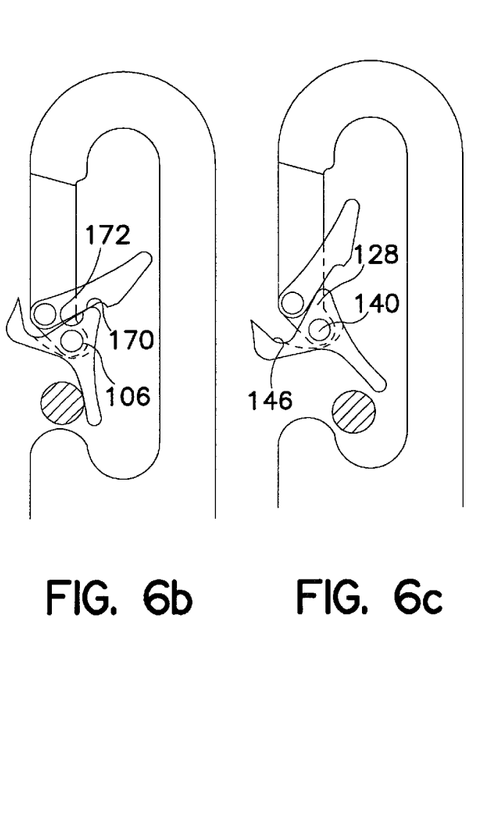
Figure 7:
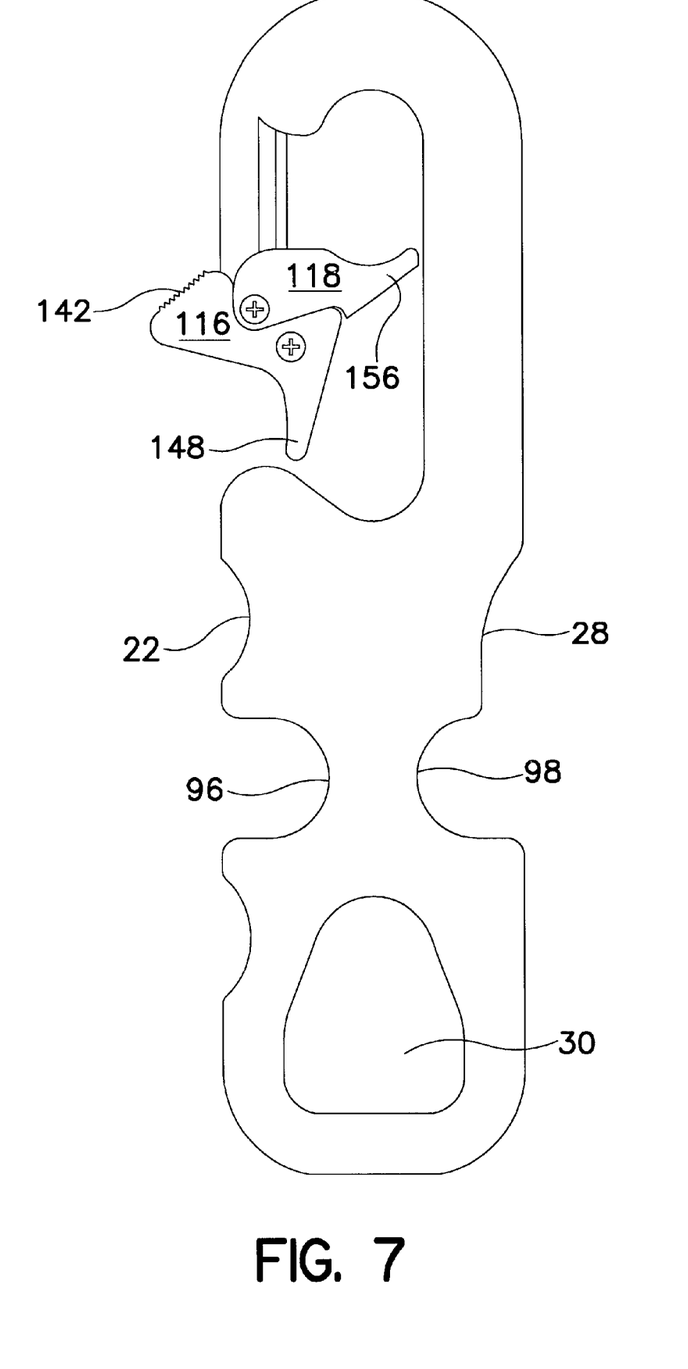
FIG. 7 is a side view of another embodiment of a static line snap in the load position.

In another embodiment of the invention shown in FIGS. 5 and 6 the static line snap 100 comprises a body 12 (only partially shown in FIGS. 5 and 6) similar to that described above with arm 46 terminating opposite surface 102 at an inwardly extending (toward the attachment cavity back wall 82) end portion 104, shown best in FIG. 6a. The end portion 104 includes a first aperture 106. A second aperture 108 is outwardly spaced from the first aperture 106 and located at approximately the junction of the arm 46 and the end portion 104. Preferably the arm 46, from the end portion 104 toward the lock end 38 is relieved 110. The body may also be similar to that shown in FIG. 7 including a large connection point 30 and indents 96, 98 on the front and rear edges 24, 26 respectively. The large connection point 30 and indents 96, 98 function to allow the snap to be temporarily connected to a line using a clove-hitch. The inside edges of the connection point 30 are preferably rounded to lessen potential chafing of the attached line. In a preferred version the body 12 is about eight inches long by about two inches wide by about three-eighths of an inch thick.

Figure 6D:
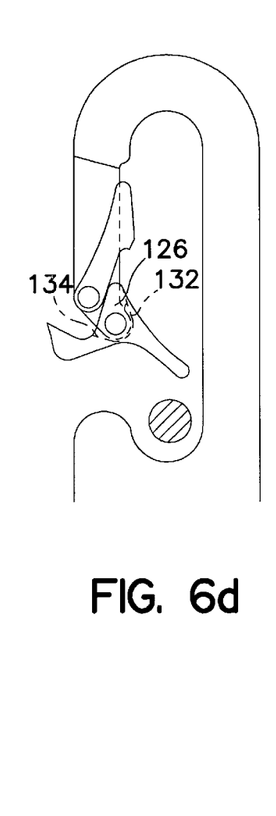
Figure 6E:
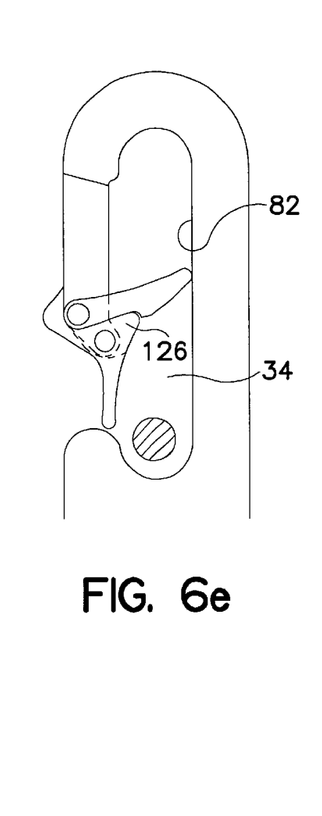

With reference to FIG. 5, the keeper is comprised of first 116 and second 118 latch pieces. The first latch piece 116 is comprised of three, generally triangularly arranged arms 120, 122, 124. A central portion 126 of the first latch piece 116 is bifurcated so that the second arm 122 is comprised of parallel spaced wings 128, 130, shown best in FIG. 6d. The bifurcation of the first latch piece 116 is defined by inner 132 and outer 134 walls. The parallel spaced wings 128, 130 each include an aligned aperture. The wings 128, 130 are positioned over the end portion 104 so that the apertures in the wings and arm first aperture 106 are aligned. A pin 140 secures the first latch piece 116 to the end portion 104 for pivotal movement limited by contact of the bifurcated portion inner and outer walls 132, 134 with the arm 46. The third arm 124 extends outwardly from the pin 140 and away from the cavity back wall 82. A free end of the third arm 124 may comprise an actuating surface 142 for gripping by a user to ease pivotal movement of the first latch piece 116. The first latch piece portion between the second 122 and third 124 arms preferably defines a concave surface 146. The first arm 120 projects from pin 140 toward surface 102. When the first latch piece outer wall 134 is adjacent arm 46 (the "lock position" shown in FIG. 6a) clockwise rotational movement of the first arm 120 is prevented so that the first arm 120 will function as a first gate 148 to prevent movement of the anchor line 90 from the load end hollow 40. Force applied inwardly against the first arm 120 serves to rotate the first gate 148 (and first latch piece 116) counterclockwise to a "load position" shown in FIG. 6d to thereby allow entry of the anchor line 90 into the load end hollow 40. A bias member (not shown) functions to return the first latch piece 116 clockwise to the "load position".

As shown in FIG. 5 the second latch piece 118 is comprised of a pair of spaced wings 152, 154 connected at a joined end to define a second gate 156. Each of the wings 152, 154 of the second gate 156 includes an aperture at the mounting end 164 opposing the joined end that is positioned over the arm second aperture 108. A pin 166 is positioned within the second latch piece apertures and arm second aperture 108 to allow limited pivotal movement of the second latch piece 118. Pivotal movement of the second latch piece is limited in the clockwise direction by contact of the second latch piece 118 with the first latch piece 116 to define a "lock position" and in the counterclockwise direction by contact of the second gate 156 with the arm 46 to define a "load position". A second latch piece bias member (not shown) functions to pivot that latch piece clockwise toward the lock position. The mounting end 164 is configured to fit within the concave portion 146 of the first latch piece 116. The fit of the mounting end 164 within the concave portion 146 functions to allow a close fit of the moving parts to provide a compact snap.

The second arm 122 defines a cam surface 170 for driving engagement with an abutting driven surface 172 on the second latch piece 118. Pivotal rotation of the first latch piece 116 in a counterclockwise direction will force the cam surface 170 against the driven surface 172 to thereby pivot the second latch piece 118 in a counterclockwise direction. It should be noted that the first 116 and second 118 latch pieces are independently mounted and biased so that counterclockwise pivotal movement of the second latch piece 118 does not affect position of the first latch piece 116.

As shown in FIG. 6a–e the static line snap 100 is used in a similar fashion to that previously described. As shown in FIG. 6a, the user moves the static line snap 100 toward the anchor line 90, forcing the first gate 148 against the anchor cable 90. The first latch piece 116 is thereby pivoted counterclockwise into the load position shown in FIG. 6d, allowing the anchor line 90 to move through slot 50 into the attachment cavity 34. Movement of the cavity load end 36 toward the anchor cable 90 places the cable 90 in the load end hollow 40. This frees the first latch piece 116 to pivot clockwise back to the lock position under the driving action of the bias member and traps the anchor cable 90 between the first gate 148 and the second gate 156. In this relationship the first latch piece 116 is prevented from rotating in a clockwise direction by contact of the outer wall 134 with the arm 46. Therefore the cable 90 cannot push past the first gate 148 outwardly to exit the cavity 34. Movement of the cavity lock end 38 toward the anchor cable 90 forces the anchor cable 90 against the second gate 156 thereby pivoting the second latch piece 118 counterclockwise to the load position shown in FIG. 6d and forcing the cable 90 to move into the cavity lock end 38. Continued movement of the attachment cavity lock end 38 toward the cable 90 places the cable into the lock end hollow 42 and frees the second latch piece 118 to pivot clockwise to the lock position shown in FIG. 6a, thereby trapping the anchor cable 90 between the second gate 156 and the attachment cavity lock end 38. With the anchor cable 90 thus trapped, engagement of the driven surface 172 and cam surface 170 prevent movement of the second latch piece 118; and both the second latch piece 118 and the first gate 148 prevent the cable 90 from exiting the cavity 34 through slot 50. As with the previous embodiment, it should be appreciated that the sequence of operations necessary to attach the static line snap 100 to the anchor cable 90 can be readily accomplished in a rapid "snap/strike/ strike" motion. Additionally, a maximum force of about five pounds is required to attach the snap to a one-half inch cable. Removal of the anchor cable 90 from the cavity 34 is accomplished via actuation of the first latch piece actuation surface 142 in a manner similar to that previously described. Manual actuation of the first latch piece 116 in a counterclockwise direction toward the load position functions to move the second latch piece 118 in the counterclockwise direction toward the load position by engagement of the cam surface 170 with the driven surface 172. Each of the latch pieces 116, 118 is moved toward the lock position independently by their respective bias members. Less than about fifteen pounds of force is required to actuate the keeper for cable 90 removal from the cavity 34.

Since the first latch piece 116 and second latch piece 118 are independently biased, once the cable 90 is within the attachment cavity lock end 38, inadvertent withdrawal of the anchor cable 90 from the lock end 38 would require the unlikely event of a failure of both bias members. Thus, the present embodiment provides an additional level of security, at the cost of somewhat greater complexity, than the previously described embodiment.

As will be apparent to persons skilled in the art, various modifications and adaptations of the structure above-described will become readily apparent without departure from the spirit and scope of the invention, the scope of which is defined in the appended claims

What is claimed is:

1. A snap comprising:
    an attachment portion having an arm opposing a surface to define a slot therebetween, an internal wall connecting the arm and the surface to define a cavity within the attachment portion and communicating with the slot, the cavity having a load end and a lock end; and
    keeper means having first and second angularly arranged gates and with a mounting adjacent the slot allowing movement of the keeper means between a first position and a second position, the keeper means for partitioning the load end from the lock end with the second gate in the keeper first position.

2. The snap of claim 1 wherein the keeper means is pivotally mounted adjacent an end of the arm or an end of the surface.

3. The snap of claim 1 wherein the second gate is pivotable independently of the first gate.

4. The snap of claim 1 wherein the first gate comprises a cam surface for pivoting the second gate.

5. The snap of claim 1 wherein the first and second gates are biased toward the first position independently of the other.

6. The snap of claim 1 wherein the keeper means comprises an internally bifurcated section.

7. The snap of claim 1 wherein the keeper means comprises a pair of spaced wings defining an internally bifurcated section.

8. The snap of claim 1 wherein the keeper means comprises a pair of spaced wings defining an internally bifurcated section, and one of the arm or the surface is mounted within the bifurcated section.

9. The snap of claim 1 wherein the keeper means is pivotably mounted to an end of the arm or an end of the surface by a pivot means.

10. The snap of claim 1 wherein the first gate projects toward one of the surface or the arm in the first position and the second gate projects into the cavity in the first position.

11. A static line connector comprising:
    an attachment portion having an arm opposing a surface to define a slot therebetween, a curved wall connecting the arm and the surface to define a cavity within the attachment portion and communicating with the slot, the cavity having a load end and a lock end;
    a handle portion extending from the attachment portion; and
    a keeper having first and second angularly arranged gates, the keeper mounting to the attachment portion adjacent the slot for movement between a lock position and a load position;
    wherein the second gate partitions the load end from the lock end in the keeper lock position.

12. The static line connector of claim 11 wherein the keeper pivotably moves from the lock position to the load position in an arc of no more than ninety degrees.

13. The static line connector of claim 11 wherein the keeper pivotably moves from the lock position to the load position in an arc and the load end and the lock end are each outside of the keeper arc.

14. The static line connector of claim 11 wherein the keeper comprises a first latch piece mounted to the attachment portion and a second latch piece mounted to the attachment portion independently of the first latch piece.

15. The static line connector of claim 11 wherein the keeper comprises a generally triangularly shaped first latch piece mounted to the attachment portion, the first latch piece including the first gate and a second latch piece mounted to the attachment portion independently of the first latch piece.

16. The static line connector of claim 11 wherein the keeper comprises a first latch piece and a second latch piece, the first latch piece mounted to the attachment portion and including the first gate, a second arm and a third arm arranged in a generally triangular fashion, a concave portion defined between the second and third arms; and a second latch piece with an end mounted to the attachment portion independently of the first latch piece, wherein the concave portion is positionable around the second latch piece end.

17. The static line connector of claim 11 wherein the keeper comprises a first latch piece and a second latch piece, the first latch piece mounted to the attachment portion and including the first gate, a second arm and a third arm arranged in a generally triangular fashion, a concave portion defined between the second and third arms; and a second latch piece including the second gate mounted to the attachment portion independently of the first latch piece, wherein the concave portion pivots the second gate when the first latch piece is pivoted.

18. A fastener for connecting a static line to an anchor, comprising:

an attachment portion selectively attachable to and detachable from the anchor, the attachment portion having an arm opposing a surface to define a slot therebetween, a curved wall connecting the arm and the surface to define an elongated cavity within the attachment portion and communicating with the slot, the cavity having a load end and an opposing lock end;

a handle portion attachable to the static line and extending from the attachment portion; and a first gate and a second gate angularly arranged to the first gate, each gate independently mounted to the attachment portion adjacent the slot for pivotal movement between a lock position and a load position; wherein the second gate partitions the load end from the lock end in the lock position and the first gate partitions the load end from the lock end in the load position.

19. The static line connector of claim 18 comprising a first latch piece mounted to the attachment portion and including the first gate, a second arm and a third arm arranged in a generally triangular fashion, a concave portion defined between the second and third arms; and a second latch piece including the second gate mounted to the attachment portion independently of the first latch piece, wherein the concave portion pivots the second gate when the first latch piece is pivoted.

20. The static line connector of claim 18 comprising a first latch piece mounted to the attachment portion and including the first gate and a cam surface; and a second latch piece including the second gate and a driven surface, the second latch piece mounted to the attachment portion independently of the first latch piece; wherein as the first latch piece rotates from the lock position to the load position the cam surface engages the driven surface to move the second latch piece from the lock position to the load position.

* * * * *